United States Patent [19]

Froeb et al.

[11] Patent Number: 4,599,605

[45] Date of Patent: Jul. 8, 1986

[54] ELECTRICAL ENCODING DEVICE

[75] Inventors: John W. Froeb, Riverside; Donald D. Mondul, Wheeling, both of Ill.

[73] Assignee: Illinois Tool Works Inc., Chicago, Ill.

[21] Appl. No.: 690,085

[22] Filed: Jan. 9, 1985

[51] Int. Cl.⁴ ............................................. H01H 19/14
[52] U.S. Cl. ................................. 340/347 P; 200/287; 200/301; 200/11 DA
[58] Field of Search ............... 318/602; 340/347 P; 200/11 DA, 11 G, 11 TW, 287, 288, 301

[56] References Cited

U.S. PATENT DOCUMENTS

| | | | |
|---|---|---|---|
| 2,664,473 | 12/1953 | Brown | 200/11 G |
| 2,751,449 | 6/1956 | Kraulec et al. | 200/11 G |
| 2,823,345 | 2/1958 | Ragland et al. | 318/602 |
| 3,257,656 | 6/1966 | Gotz et al. | 318/602 X |
| 4,135,065 | 1/1979 | Nicot | 200/11 DN |
| 4,212,000 | 7/1980 | Yamada | 340/347 P |
| 4,278,857 | 7/1981 | Wernimont | 200/288 |
| 4,345,240 | 8/1982 | Amano et al. | 340/347 P |
| 4,390,757 | 6/1983 | Wiessner | 200/11 G |
| 4,451,715 | 5/1984 | Neese | 200/11 G |

*Primary Examiner*—B. Dobeck
*Attorney, Agent, or Firm*—Donald D. Mondul; Thomas W. Buckman

[57] ABSTRACT

An electrical encoding device for generating a coded input to an electrical apparatus, which coded input can indicate direction and speed of movement of an actuator associated with an electrical encoding device. The device is cheaper to manufacture since the layout of certain aspects of the device is greatly simplified, the simplified layout of certain aspects of the device reducing cost of manufacture of the device. The device is designed to easily accommodate various encoding parameters so that it may be manufactured in a family-program fashion with families of the device being capable of addressing a range of encoding parameters.

36 Claims, 13 Drawing Figures

ELECTRICAL ENCODING DEVICE

BACKGROUND OF THE INVENTION

The present invention is directed to an electrical encoding device for generating a coded input to an electrical apparatus, which electrical encoding device is particularly suited for indicating to an electrical apparatus the speed and direction of movement of an actuator associated with the electrical encocoding device. When used with an electrical apparatus with appropriate memory capability, position of the actuator associated with the electrical encoding device can also be indicated to the electrical apparatus.

In particular, the present invention provides an electrical encoding device which is more easily checked for precision of final product in a production environment and at production volumes than prior art devices.

Further, the present invention provides an electrical coding device more easily and more cheaply adaptable to accommodating varying encoding parameters than are prior art devices.

SUMMARY OF THE INVENTION

The invention is an electrical encoding device for generating a coded input to an electrical apparatus, which coded input can be indicated direction and speed of movement of an actuator associated with the electrical encoding device, as well as position of that actuator. The present invention is designed to provide an electrical encoding device which is cheaper to manufacture since the layout of certain aspects of the device is greatly simplified. Further, the simplified layout of certain aspects of the present invention facilitates ease of quality control inspection, thus further reducing the cost of manufacture of the device.

Additional features of the present invention facilitate ease of adaptation of the electrical encoding device to accommodate various encoding parameters so that the device of the present invention can be manufactured in a family-program fashion, with families of models of the device being manufactured, each of which families being capable of addressing a range of particular encoding parameters. In such a manner, the number of discrete tools required to manufacture devices of the type disclosed in this application to address a wide range of encoding parameters is minimized. Further reduction of costs of production is thereby realized.

A further feature of the present invention provides an improved damping mechanism for contributing to minimization of contact bounce during actuation of the device.

It is, therefore, an object of this invention to provide an electrical encoding device which is simple in its design and facilitates easy inspection of the accuracy of finished products manufactured according to the invention.

A further object of this invention is to provide an electrical encoding device which is capable of easily and inexpensively being adapted to accommodate a range of encoding parameters.

Yet a further object of this invention is to provide an electrical encoding device which has improved operational characteristics resulting in less contact bounce during actuation.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
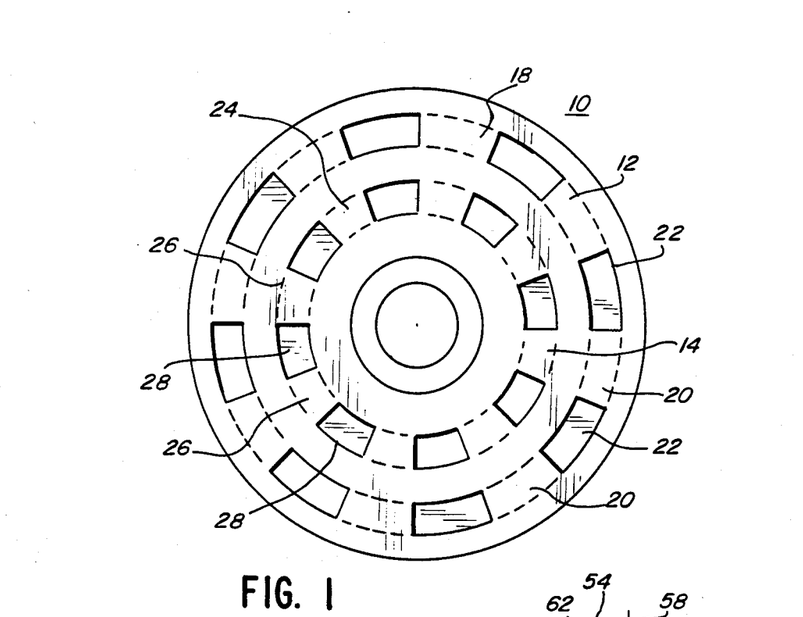
FIG. 1 is a plan view of the fixed contacts of the preferred embodiment of an electrical encoding device according to the present invention.

Referring to FIG. 1, a plan view of a fixed contact assembly 10 is shown. The fixed contact assembly 10 has an outer fixed contact pattern 12 and an inner fixed contact pattern 14. Additionally, the fixed contact assembly 10 has a common contact 16.

The outer fixed contact pattern 12 is preferably comprised of a circular printed race 18 which printed race 18 is overlaid with a dielectric insulative material in selected areas in order that alternating patterns of insulated segments 20 and exposed segments 22 are presented. Thus, the outer fixed contact pattern 12, comprised of alternating insulating segments 20 and exposed segments 22 presents to a movable contact, as hereinafter described in greater detail, a pattern of intermittently contactable exposed segments 22 which are electrically common.

The inner fixed contact pattern 14 is constructed similarly to the outer fixed contact pattern 12 in that the inner fixed contact pattern 14 is comprised of a printed race 24 overlaid with a dielectric material to produce alternating insulated segments 26 and exposed segments 28. Thus, the inner fixed contact pattern 14 presents to a movable contact, to be hereinafter described in greater detail, an intermittently electrically accessible pattern of exposed segments 28 which are electrically in common.

The common contact 16 is comprised of a printed race similar to the printed races 18 and 24, however, no dielectric is overlaid upon the common contact 16 to produce any intermittent electrical accessibility.

Figure 2:
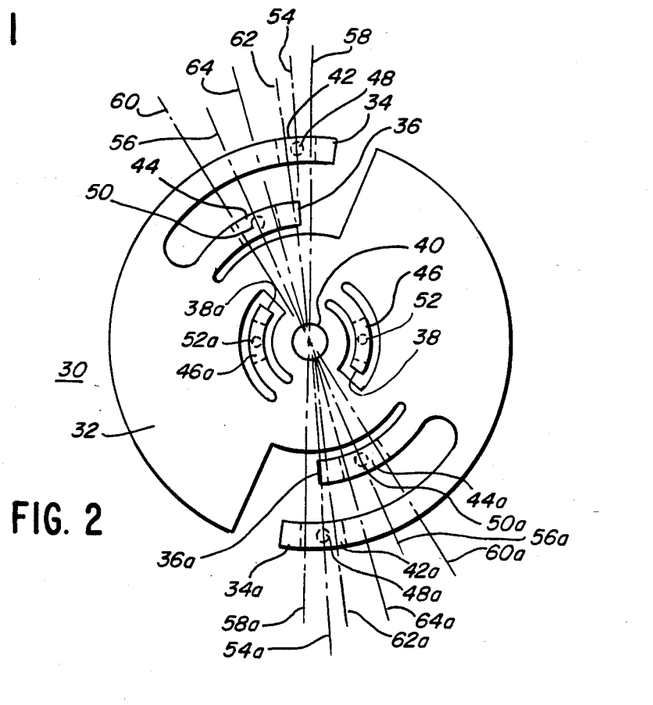
FIG. 2 is a plan view of the movable contacts of an electrical encoding device according to the present invention.

FIG. 2 presents a plan view of a movable contact 30 for an electrical encoding device according to the present invention. The movable contact 30 is comprised of a base portion 32, from which base portion 32 a plurality of movable contact fingers depend. Movable contact fingers 34 and 34a are situated at a radial distance from the center of the base portion 32 appropriately to cause movable contacts 34 and 34a to effect contact with outer fixed contact pattern 12 of FIG. 1 when the encoding device is in an assembled condition.

Movable contact fingers 36 and 36a also depend from base portion 32 of the movable contact 30. Movable contact fingers 36 and 36a are radially displaced from the center of base portion 32 an appropriate distance to align movable contacts 36 and 36a with inner fixed contact pattern 14 of FIG. 1 when the encoding device is in an assembled condition.

Movable contact fingers 38 and 38a depend from base portion 32 of movable contact 30 and are radially displaced from the center of base portion 32 a distance appropriate to enable sliding contact with common contact 16 of FIG. 1 when the encoding device is in an assembled condition.

An aperture 40 may be provided in the base portion 32 to facilitate mounting of the movable contact 30 to an actuator (not shown).

The movable contact fingers 34 and 34a, 36, 36a, 38 and 38a depend from the base portion 32 from one end and each has a free end which is biased downward toward the fixed contact assembly 10 when the encoding device is in an assembled condition to ensure good electrical contact with the fixed contact patterns 12 and 14 and the common contact 16 during operation of the encoding device. Each of the movable contact fingers 34, 34a, 36, 36a, 38, and 38a also has a flat area 42, 44, and 46 and an associated contact defining button 48, 50, and 52.

It should be noted that the flat structures 42, associated with movable contact fingers 34 are angularly displaced from the flat structures 44 associated with movable contact fingers 36, thus flat structures 42, 42a are substantially centered on radii 54, 54a and flat structures 44, 44a are substantially centered on radii 56, 56a. It is the angular displacement of the contact defining buttons on the movable contact fingers associated with the outer fixed contact pattern 12 and the inner fixed contact pattern 14 of the fixed contact assembly 10 of FIG. 1 which effects out-of-phase contact making and breaking between the movable contact 30 and the fixed contact assembly 10 during assembled operation of the encoding device, thus performing an encoding function indicating direction and speed of movement of the movable contact 30 with respect to the fixed contact assembly 10.

Moreover, the angular expanse of the flat structures of the various movable contact fingers enable location of the contact defining buttons anywhere within that expanse of flat structure so that the angular displacement of the contact defining buttons between various of the movable contact fingers can be easily altered to change the phase displacement operation of the encoding device. Thus, contact defining buttons 48, 48a could be centered on radii 58, 58a with the contact defining buttons 50, 50a being centered on radii 60, 60a to give maximum phase displacement between the two. Similarly, the contact defining buttons 48, 48a could be oriented on radii 62, 62a and the contact defining buttons 50, 50a oriented on radii 64, 64a to provided minimum phase displacement between the two. Of course, any selection of phase displacement between such a maximum and minimum phase displacement could just as easily be established.

The contact defining buttons 48, 50, and 52 can be formed by any known method, such as a soldered or welded ball of electrically conductive material or a spherically shaped protuberace stamped in the associated movable contact finger.

Figure 3:
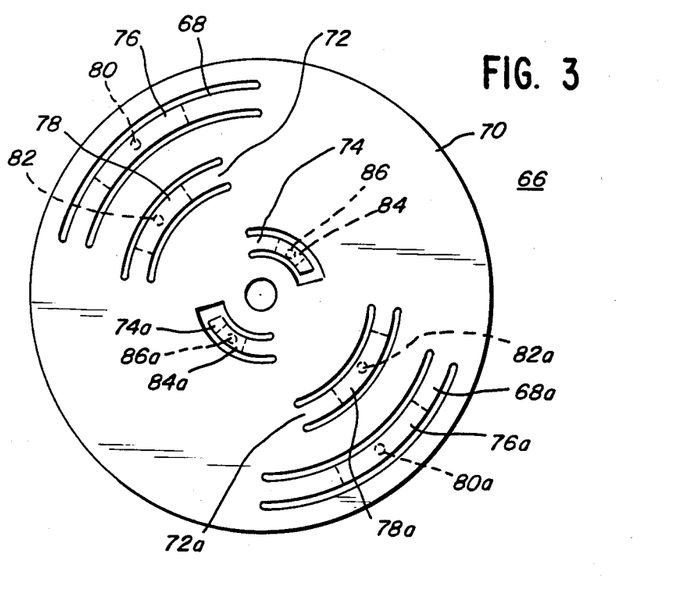
FIG. 3 is a plan view of an alternate embodiment of the movable contacts of an electrical encoding device according to the present invention

FIG. 3 illustrates an alternate embodiment 66 of a movable contact. Movable contact 66 is similar to movable contact 30 of FIG. 2 in that movable contact fingers 68, 68a are radially displaced from the center of a base portion 70 appropriately to track on outer fixed contact pattern 12 of the fixed contact assembly 10 of FIG. 1 when the encoding device is in as assembled condition. Similarly, movable contact fingers 72, 72a are radially displaced from the center of base portion 70 appropriately to allow tracking on inner fixed contact pattern 14 of FIG. 1 when the encoding device is in an assembled condition. Still further, movable contact fingers 74, 74a are appropriately situated with respect to the center of base portion 70 to track on common contact 16 of FIG. 1.

In the embodiment of the movable contact 66, however, the movable contact fingers 68, 68a, 72, and 72a depend from the base portion 70 at two ends and are biased downward to effect contact with the fixed contact assembly 10 of FIG. 1. Such a two-ended termination in the base portion 70 serves to reduce contact bounce during operation of the encoding device independent of rotational direction.

The movable contact fingers 68, 68a, 72, 72a incorporate flat structures 76, 76a, 78, and 78a and contact defining buttons 80, 80a, 82, and 82a in a manner similar to the flat structures and contact defining buttons which are shown in FIG. 2 and for the same purposes. Phase relationships in terms of angular displacement among the various contact defining buttons is, also, effected in the embodiment shown in FIG. 3 in a manner similar to the manner in which such adjustments are effected in the embodiment shown in FIG. 2. Movable contact fingers 74, 74a may be of a one-ended depending type as shown in FIG. 3 or may be constructed of a two-ended depending structure similar to movable contact fingers 68 and 70 of FIG. 3. Movable contact fingers 74, 74a also have flat structures 84, 84a and contact defining buttons 86, 86a.

Figure 4:
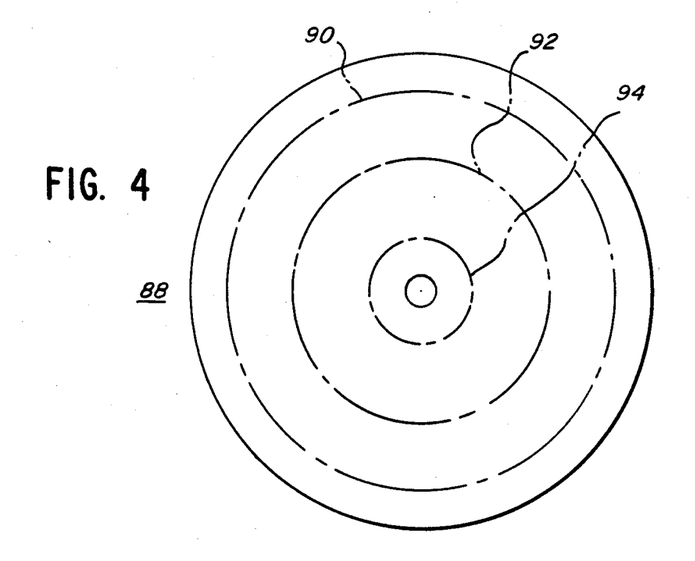
FIG. 4 is a plan view of a second alternate embodiment of the movable contacts of an electrical encoding device according to the present invention.

FIG. 4 illustrates a third embodiment of a movable contact. The movable contact 88 of FIG. 4 is constructed as a disc which is formed to exert a downward bias against the fixed contact assembly 10 of FIG. 1 when the encoding device is in an assembled condition. Indicated on the movable contact 88 of FIG. 4 are radial traces 90, 92, and 94, which radial traces represent the centers of radial displacement of outer fixed contact pattern 12, inner fixed contact pattern 14, and common contact 16 of the fixed contact assembly 10 of FIG. 1, respectively. In the embodiment of movable contact 88, appropriately angularly displaced contact defining buttons (not shown) may be situated anywhere along radial traces 90, 92 and 94 to establish appropriate phase relationships for making and breaking of electrical contact between movable contact 88 and fixed contact assembly 10 for generating an encoded output indicating the direction and speed of movement of movable contact 88 with respect to fixed contact assembly 10. Thus, movable contact 88 represents a truly analog adjustment capability of phase relationships among the various contacts without any limitations of dimensions of flat structures such as are present in the embodiments of FIGS. 2 and 3. It can easily be seen that the embodiment of the movable contact 88 of FIG. 4 allows maximum flexibility of manufacture of a family of encoding devices whereby discs may be manufactured as movable contact elements for an entire family of encoding devices. Fixed contact assembly 10, of the sort depicted by FIG. 1, can likewise be manufactured as a standard element of a family of encoding devices, and contact defining buttons may be affixed along radial traces 90, 92, and 94 of movable contact 88 in any positions and in any angular displacement relationships to establish phase relationships desired for particular encoding schemes.

Figures 5, 6, 7, 8, 9:
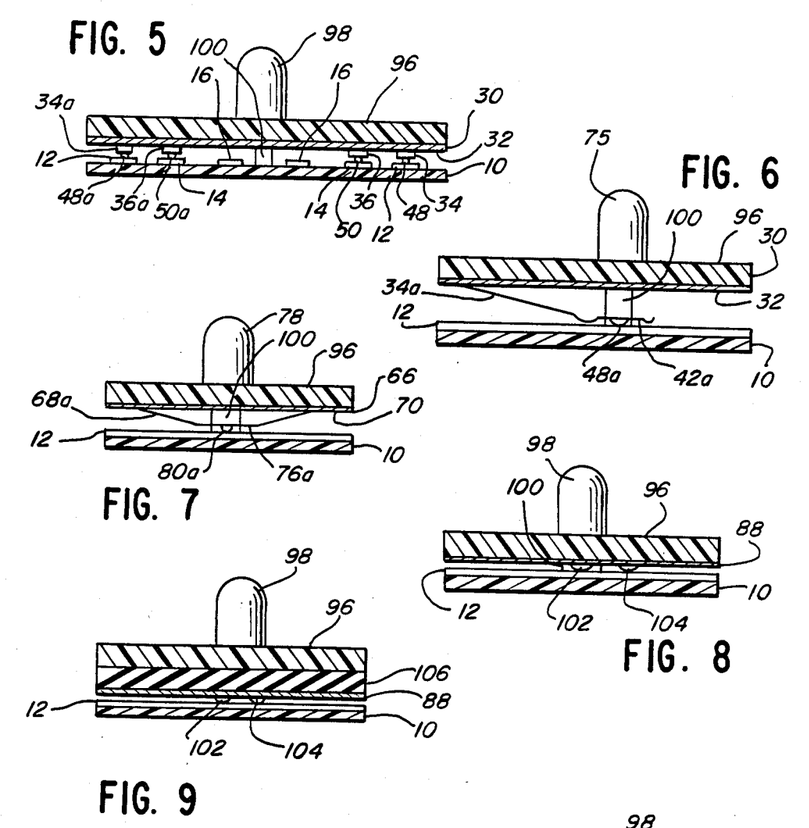
FIG. 5 is schematic diagram showing, in side sectional view, an embodiment of an electrical encoding device incorporating a movable contact of the type shown in FIG. 2.
FIG. 6 is a schematic diagram showing, in side sectional view, an embodiment of an electrical encoding device incorporating movable contacts as shown in FIG. 2, as viewed from the left side of FIG. 5.
FIG. 7 is a schematic diagram, in side sectional view, of an embodiment of an electrical encoding device employing movable contacts of the type shown in FIG. 3.
FIG. 8 is a schematic diagram, in side sectional view, of an electrical encoding device with movable contacts of the type shown in FIG. 4.
FIG. 9 is a schematic drawing, in side sectional view, of an embodiment of an electrical encoding device having movable contacts of the type shown in FIG. 4, and incorporating a resilient pad as a damping means.

FIG. 5 represent in schematic diagram, a side view of the encoding device of the present invention incorporating a movable contact 30 of the type shown in FIG. 2.

For purposes of ease of understanding the present invention, similar elements will be given similar reference numbers wherever appearing in the various drawings.

In FIG. 5 an actuator 96, having a knob 98 to facilitate movement of the actuator 96, has mounted thereon movable contact 30. The actuator 96 is attached to a fixed contact assembly 10 by a shaft 100 by an appropriate means known in the art.

Depending from the base portion 32 of the movable contact 30 are movable contact fingers 34, 34a, 36, and 36a. Movable contact fingers 38 and 38a depend from the body portion 32 in a similar manner but are not shown in FIG. 5 in order to facilitate understanding of the invention. Affixed to the movable contact fingers 34, 34a are contact defining buttons 48, 48a and affixed to movable contact fingers 36, 36a are contact defining buttons 50, 50a.

Contact defining buttons 48, 48a, 50, and 50a are held in contact by the downward bias of movable contact fingers 34, 34a, 36 and 36a against outer fixed contact pattern 12 and inner fixed contact pattern 14. Common contact 16 is shown in FIG. 5 as well.

FIG. 6 is a schematic side view of the device illustrated by FIG. 5, taken from the left side of FIG. 5. Thus, FIG. 6 illustrates a knob 98 mounted to an actuator 96 which carries a movable contact 30 and is mounted to a fixed contact assembly 10 by a shaft 100. Depending from the body portion 32 of the movable contact assembly 30 is movable contact finger 34a which is biased downward against outer fixed contact pattern 12. Movable contact finger 34a has a flat structure 42a which carries thereon a contact defining button 48a. It is contact defining button 48a which maintains electrical and physical contact with outer fixed contact pattern 12 because of the bias applied by movable contact finger 34a.

FIG. 7 illustrates a schematic side view of an encoding device according to the present invention incorporating a movable contact 66 as shown in FIG. 3. In FIG. 7, a knob 98 is affixed to an actuator 96 on which is mounted the movable contact 66, all of which elements are attached to the fixed contact assembly 10 by a shaft 100.

Movable contact finger 68a is attached at two ends to the base portion 70 of movable contact 66 and is downwardly biased toward the outer fixed contact pattern 12. Movable contact finger 68a has flat structure 76a which carries thereon contact defining button 80a. It is contact defining button 80a which maintains physical and electrical contact with outer fixed contact pattern 12 in response to the downward bias exerted by movable contact finger 68a.

FIG. 8 is a schematic side view of an encoding device according to the present invention incorporating a movable contact 88 as shown in FIG. 4. Thus, in FIG. 8, a knob 98 is affixed to an actuator 96 which has mounted thereon movable contact 88 and is mounted to fixed contact assembly 10 by a shaft 100. Depending from the movable contact 88 are contact defining buttons 102 and 104 which are maintained against the outer fixed contact pattern 12 and the inner fixed contact pattern 14 (not shown) respectively in response to the downward bias provided by movable contact 88. It should be noted, that contact defining buttons 102 and 104 are angularly displaced in order to establish the desired phase differential to effect the encoding function of the device as hereinbefore discussed.

FIG. 9 illustrates an alternate embodiment of the device shown in FIG. 8 incorporating a damping pad 106 to alleviate the effects of contact bounce during operation of the device.

Thus, in FIG. 9, a knob 98 is attached to an actuator 96 which has mounted thereon a damping pad 106, preferably fashioned of a resilient material. The damping pad has affixed thereto a movable contact 88 of the type shown in FIG. 4 and, depending from movable contact 88, are contact defining buttons 102 and 104, which contact buttons 102, 104 are angularly displaced to establish the desired phase relationship for encoding operations by the device. The actuator, with its associated damping pad and movable contact, is mounted to the fixed contact assembly 10 by a shaft (not shown) by appropriate means known in the art. Contact defining buttons 102 and 104 maintain electrical and physical contact with the outer fixed contact pattern 12 and the inner fixed contact pattern 14 (not shown) in response to the downward bias applied by movable contact 88.

Figure 10:
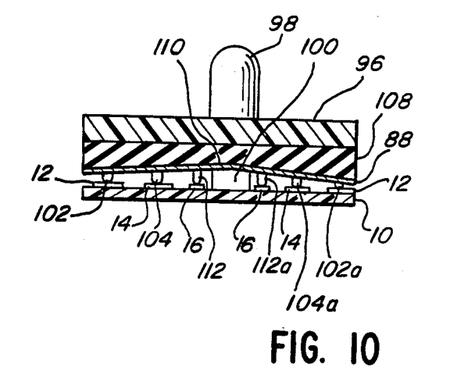
FIG. 10 is a schematic drawing, in side sectional view, of an embodiment of an electrical encoding device having movable contacts of the type shown in FIG. 4, and having a damping means, which damping means also applies a bias to the movable contact to maintain contact pressure between the movable contact and the fixed contact.

FIG. 10 illustrates another embodiment of the encoding device of the present invention incorporating a movable contact 88 of the type shown in FIG. 4.

Thus, in FIG. 10, a knob 98 is affixed to an actuator 96, which actuator 96 has affixed thereto a damping pad 108, which damping pad carries thereon movable contact 88. The actuator 96, with its associated damping pad 108 and movable contact 88, is mounted on the fixed contact assembly 10 by a shaft 100 by an appropriate means known in the art.

The damping pad 108 is constructed to have a gentle U-shaped cross section with the bight 110 of the "U" being substantially centered with respect to the movable contact 88. With such a structure incorporated in the damping pad 108, the damping pad 108 applies a downward bias to the movable contact 88, which is shown in exaggeratedd form in FIG. 10 as a general gentle "U" cross section of movable contact 88.

Thus, in FIG. 10, contact defining buttons 102, 102a maintain electrical and physical contact with outer fixed contact pattern 12; contact defining buttons 104, 104a maintain electrical and physical contact with inner fixed contact pattern 14; and contact defining buttons 112, 112a maintain electrical and physical contact with common contact 16 in response to the downward bias applied by damping pad 108 through movable contact 88.

Figure 11:
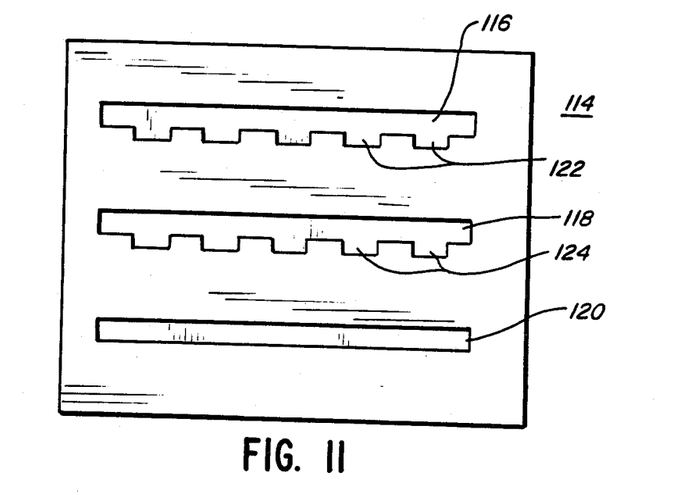
FIG. 11 is a plan view of the fixed contacts of an electrical encoding device oriented for linear actuation.

FIG. 11 illustrates a fixed contact assembly 114 adapted for linear actuation of the device according to the present invention.

In FIG. 11, the fixed contact assembly 114 has associated therewith a first fixed contact pattern 116 and a second fixed contact pattern 118, as well as a common contact 120.

First fixed contact pattern 116 has a plurality of encoding pads 122 which are electrically in common; and second fixed contact pattern 118 has a plurality of encoding pads 124 which are electrically in common.

Fixed contact patterns 116, 118 are configured as a base line with intermittent integral pads 122, 124. Such construction could as well be used in fashioning outer fixed contact pattern 12 and inner fixed contact pattern 14 of FIG. 1. Conversely, the trace pattern with a dielectric overlay exposing segments 22, 28 as described in connection with FIG. 1 could be used to fashion fixed contact patterns 116, 118 of FIG. 11.

Figure 12:
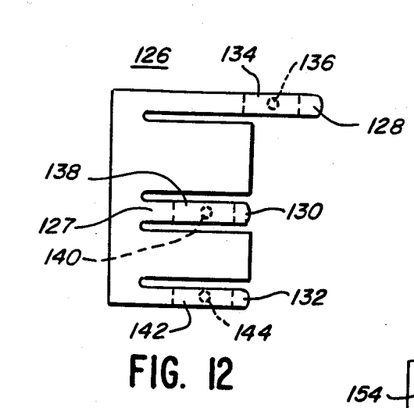
FIG. 12 is a plan view of a movable contact for an electrical encoding device having fixed contacts arranged in linear orientation as shown in FIG. 11.

FIG. 12 illustrates a first embodiment of a movable contact 126 for use in encoding operations with a fixed contact assembly 114 as shown in FIG. 11.

In FIG. 12, the movable contact 126 has movable contact fingers 128, 130 and 132. Movable contact fingers 128, 130 and 132 depend from base portion 127 of movable contact 126 and are biased toward fixed contact assembly 114 to maintain electrical and physical contact with fixed contact patterns 116 and 118 and common contact 120 when the device is in an assembled condition. Movable contact finger 128 has a flat structure 134 and, affixed to that flat structure by appropriate means known in the art and discussed hereinabove with respect to other embodiments of this invention, a contact defining button 136. Movable contact fingers 130 and 132 are similarly fashioned with movable contact finger 130 having a flat structure 138 and a contact defining button 140 affixed thereto and movable contact finger 132 having a flat structure 142 with a contact defining button 144 affixed thereto.

Contact defining buttons 136 and 140 are linearly displaced with respect to encoding pads 122 and 124 to provide appropriate phase displacement for performance of encoding operations by the present invention in an assembled condition.

The phase displacement of contact defining buttons 136 and 140 can be easily adjusted within the limits of their respective flat structures 134 and 138 to provide a range of linear (and phase) displacement adjustability for a given movable contact 126.

Figure 13:
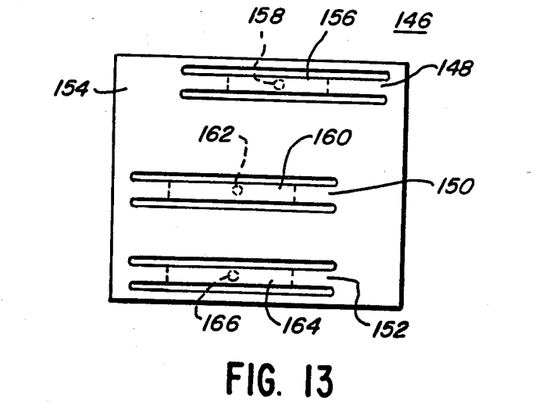
FIG. 13 is a plan view of an alternate embodiment of a movable contact for an electrical encoding device having fixed contacts arranged in linear orientation as shown in FIG. 11.

FIG. 13 illustrates an alternate embodiment of a linearly operable movable contact for an encoding device.

In FIG. 13, a movable contact 146 has movable contact fingers 148, 150 and 152, which movable contact fingers 148, 150 and 152 are depending from the base portion 154 of the movable contact 146 at two ends.

The movable contact fingers 148, 150 and 152 are downwardly biased to maintain physical and electrical contact with the first fixed contact pattern 116, the second fixed contact pattern 118 and the common contact 120 when the encoding device is in an assembled condition. Movable contact finger 148 has a flat structure 156 and a contact defining button 158 affixed thereto; movable contact finger 150 has a flat structure 160 and a contact defining button 162 affixed thereto; movable contact finger 152 has a flat structure 164 and a contact defining button 166 affixed thereto.

It should be noted that contact defining buttons 158 and 162 are linearly (and, hence, phase) displaced with respect to each other to provide for appropriate phase displacement with respect to first fixed contact pattern 116 and second fixed contact pattern 118 and their associated encoding pads 122, 124 for encoding operation of the device.

It is to be understood that, while the detailed drawings and specific examples given describe prefered embodiments of the invention, they are for the purpose of illustration only, that the apparatus of the invention is not limited to the precise details and conditions disclosed and that various changes may be made therein without departing from the spirit of the invention which is defined by the following claims.

We claim:

1. An electrical encoding device for generating a coded input to an electrical apparatus comprising actuation means for effecting actuation of the switching device, fixed contact means for contributing to generation of said coded input and movable contact means for contributing to generation of said coded input in response to said actuator means and in cooperation with said fixed contact means; said fixed contact means comprising a plurality of discrete patterns of fixed contacts arranged in substantially circular arrays oriented substantially concentrically about an axis, at least one of said plurality of discrete patterns comprising a plurality of contact pads electrically in common, respective of said contact pads in each of said at least one of said plurality of discrete patterns being substantially aligned with angularly separated common radii originating from a point on said axis to establish a plurality of sets of said plurality of contact areas, each of said sets being substantially radiallly aligned; said movable contact means comprising a plurality of electrically common tracking means for establishing a plurality of contact areas between said fixed contact means and said movable contact means, each of said plurality of tracing means being associated with a respective one of said plurality of discrete patterns; said generation of said coded input being effected by appropriate angular displacement of respective pairs of said plurality of tracking means with respective of said sets of said plurality of contact areas.

2. An electrical encoding device for generating a coded input to an electrical apparatus as recited in claim 1 wherein said movable contact means further comprises at least one additional plurality of electrically common tracking means, each of said at least one additional plurality of tracking means having each of its respective plurality of tracking means associated with a respective one of said plurality of discrete patterns and angularly displaced from others of said plurality and said at least one additional plurality of tracking means associated with the same respective one of said plurality of discrete patterns.

3. An electrical encoding device for generating a coded input to an electrical apparatus as recited in claim 2 wherein said angular displacement of said tracking means associated with a respective discrete pattern is substantially in phase with said angular separation of said radii with which said contact pads are substantially aligned.

4. An electrical encoding device for generating a coded input to an electrical apparatus as recited in claim 1, 2, or 3 wherein said plurality of tracking means comprises a plurality of contact fingers, each of said fingers depending by a fixed end from a common piece and biased to apply a force against said fixed contact means at a contact spot, said plurality of contact areas corresponding to said contact spot of each of said plurality of fingers.

5. An electrical encoding device for generating a coded input to an electrical apparatus as recited in claim 4 wherein said contact spot of each of said plurality of fingers has a length of generally flat structure substantially parallel with said fixed contact means, and said length of generally flat structure has thereon a contact definition means for establishing said contact area.

6. An electrical encoding device for generating a coded input to an electrical apparatus as recited in claim 5 wherein said contact definition means comprises an electrically conductive mass of material physically affixed to said length of generally flat structure and electrically communicative therewith.

7. An electrical encoding device for generating a coded input to an electrical apparatus as recited in claim 6 whrein said physical affixation is accomplished by welding.

8. An electrical encoding device for generating a coded input to an electrical apparatus as recited in claim 5 wherein said contact definition means comprises an integral displaced mass of said length of generally flat structure.

9. An electrical encoding device for generating a coded input to an electrical apparatus as recited in claim 8 wherein said switching device further comprises damping means associated with said movable contact means for alleviating bouncing of said contact definition means against said fixed contact means, said damping means biasing said movable contact means toward said fixed contact means.

10. An electrical encoding device for generating a coded input to an electrical apparatus as recited in claim 1, 2, or 3 wherein said plurality of tracking means comprises a plurality of contact fingers depending by a first end and a second end from a common piece and biased to apply a force against said fixed contact means at a contact zone intermediate said first end and said second end, said plurality of contact areas corresponding to said contact zone of each of said plurality of fingers.

11. An electrical encoding device for generating a coded input to an electrical apparatus as recited in claim 10 wherein said contact zone of each of said plurality of fingers has a length of generally flat structure substantially parallel with said fixed contact means, and said length of generally flat structure has thereon a contact definition means for establishing said contact area.

12. An electrical encoding device for generating a coded input to an electrical apparatus as recited in claim 11 wherein said contact definition means comprises an electrically conductive mass of material physically affixed to said length of generally flat structure and electrically communicative therewith.

13. An electrical encoding device for generating a coded input to an electrical apparatus as recited in claim 12 wherein said physical affixation is accomplished by welding.

14. An electrical encoding device for generating a coded input to an electrical apparatus as recited in claim 11 wheren said contact definition means comprises an integral displaced mass of said length of generally flat structure.

15. An electrical encoding device for generating a coded input to an electrical apparatus as recited in claim 14 wherein said switching device further comprises damping means associated with said movable contact means for alleviating bouncing of said contact definition means against said fixed contact means, said damping means biasing said movable contact means toward said fixed contact means.

16. An electrical encoding device for generating a coded input to an electrical apparatus as recited in claim 1, 2 or 3 wherein said movable contact means comprises an electrically conductive disc and said plurality of tracking means comprises a plurality of contact definition means for establishing said contact area, said contact definition means comprising contact defining buttons extending from said disc and bearing against said fixed contact means.

17. An electrical encoding device for generating a coded input to an electrical apparatus as recited in claim 16 wherein said disc is configured to apply a bias force against said fixed contact means through said contact definition means.

18. An electrical encoding device for generating a coded input to an electrical apparatus as recited in claim 17 wherein said switching device further comprises damping means associated with said movable contact means for alleviating bouncing of said contact definition means against said fixed contact means, said damping means biasing said movable contact means toward said fixed contact means.

19. An electrical encoding device for generating a coded input to an electrical apparatus as recited in claim 18 wherein said damping means comprises a resilient pad between said actuator means and said disc.

20. An electrical encoding device for generating a coded input to an electrical apparatus as recited in claim 16 wherein said switching device further comprises damping means associated with said movable contact means for alleviating bouncing of said contact definition means against said fixed contact means, said damping means biasing said movable contact means toward said fixed contact means.

21. An electrical encoding device for generating a coded input to an electrical apparatus as recited in claim 20 wherein said damping means comprises a resilient pad between said actuator means and said disc; said pad being configured to cause said disc to apply said bias against said fixed contact means through said contact definition means.

22. An electrical encoding device for generating a coded input to an electrical apparatus comprising actuation means for effecting actuation of the switching device, fixed contact means for contributing to generation of said coded input, and movable contact means for contributing to generation of said coded input in response to said actuator means and in cooperation with said fixed contact means; said fixed contact means comprising a plurality of discrete patterns of fixed contacts arranged in substantially parallel generally linear arrays, at least one of said plurality of discrete patterns comprising a plurality of contact pads electrically in common, respective of said contact pads in each of said at least one of said plurality of discrete patterns being substantially aligned with linearly separated axes substantially perpendicular to said linear arrays to establish a plurality of sets of contact areas, each of said sets being substantially between two of said axes; said movable contact means comprising a plurality of electrically common tracking means for establishing a plurality of contact areas between said fixed contact means and said movable contact means, each of said plurality of tracking means being associated with a respective one of said plurality of discrete patterns; said generation of said coded input being effected by appropriate linear displacement of respective pairs of said plurality of tracking means with respect to said sets of said plurality of contact areas.

23. An electrical encoding device for generating a coded input to an electrical apparatus as recited in claim 22 wherein said plurality of tracking means comprises a plurality of contact fingers, each of said fingers depending by a fixed end from a common piece and biased to apply a force against said fixed contact means at a contact spot, said plurality of contact areas corresponding to said contact spot of each of said plurality of fingers.

24. An electrical encoding device for generating a coded input to an electrical apparatus as recited in claim 23 wherein said contact spot of each of said plurality of fingers has a length of generally flat structure substantially parallel with said fixed contact means, and said length of generally flat structure has thereon a contact definition means for establishing said contact area.

25. An electrical encoding device for generating a coded input to an electrical apparatus as recited in claim 24 wherein said contact definition means comprises an electrically conductive mass of material physically affixed to said length of generally flat structure and electrically communicative therewith.

26. An electrical encoding device for generating a coded input to an electrical apparatus as recited in claim 25 wherein said contact definition means comprises an integral displaced mass of said length of generally flat structure.

27. An electrical encoding device for generating a coded input to an electrical apparatus as recited in claim 26 wherein said switching device further comprises damping means associated with said movable contact means for alleviating bouncing of said contact definition means against said fixed contact means, said damping means biasing said movable contact means toward said fixed contact means.

28. An electrical encoding device for generating a coded input to an electrical apparatus as recited in claim 22 wherein said plurality of tracking means comprises a plurality of contact fingers depending by a first end and a second end from a common piece and biased to apply a force against said fixed contact means at a contact zone intermediate said first end and said second end, said plurality of contact areas corresponding to said contact zone of each of said plurality of fingers.

29. An electrical encoding device for generating a coded input to an electrical apparatus as recited in claim 28 wherein said contact zone of each of said plurality of fingers has a length of generally flat structure substantially parallel with said fixed contact means, and said length of generally flat structure has thereon a contact definition means for establishing said contact area.

30. An electrical encoding device for generating a coded input to an electrical apparatus as recited in claim 29 wherein said contact definition means comprises an electrically conductive mass of material physically affixed to said length of generally flat structure and electrically communicative therewith.

31. An electrical encoding device for generating a coded input to an electrical apparatus as recited in claim 30 wherein said contact definition means comprises an integral displaced mass of said length of generally flat structure.

32. An electrical encoding device for generating a coded input to an electrical apparatus as recited in claim 31 wherein said switching device further comprises damping means associated with said movable contact means for alleviating bouncing of said contact definition means against said fixed contact means, said damping means biasing said movable contact means toward said fixed contact means.

33. An electrical encoding device for generating a coded input to an electrical apparatus as recited in claim 22 wherein said movable contact means comprises an electrically conductive generally planar member and said plurality of tracking means comprises a plurality of contact definition means for establishing said contact area, said contact definition means comprising contact defining buttons extending from said generally planar member and bearing against said fixed contact means.

34. An electrical encoding device for generating a coded input to an electrical apparatus as recited in claim 33 wherein said generally planar member is configured to apply a bias force against said fixed contact means through said contact definition means.

35. An electrical encoding device for generating a coded input to an electrical apparatus as recited in claim 34 wherein said switching device further comprises damping means associated with said movable contact means for alleviating bouncing of said contact definition means against said fixed contact means, said damping means biasing said movable contact means toward said fixed contact means.

36. An electrical encoding device for generating a coded input to an electrical apparatus as recited in claim 35 wherein said damping means comprises a resilient pad between said actuator means and said generally planar member.

* * * * *